Figure 1:
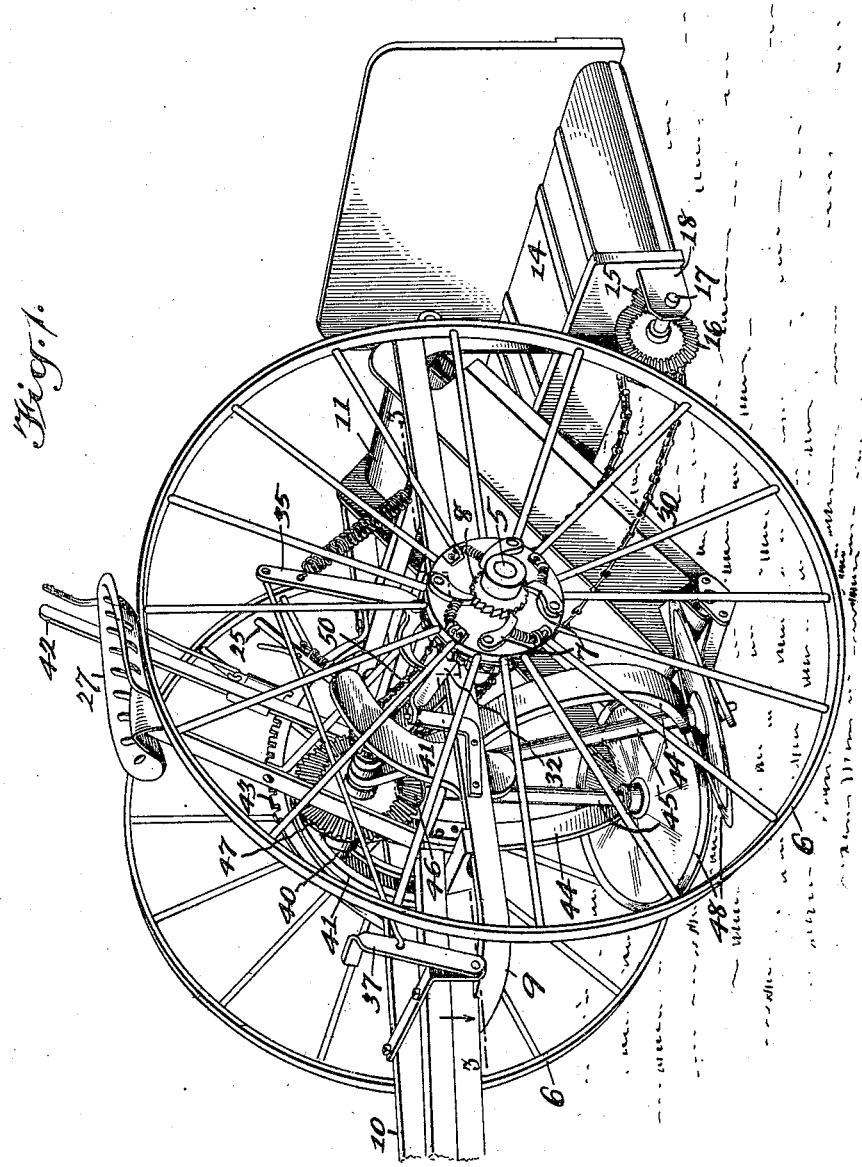

F. H. QUANCE.
BEAN HARVESTER.
APPLICATION FILED APR. 7, 1915.

1,174,762.

Patented Mar. 7, 1916.
3 SHEETS—SHEET 2.

WITNESSES:

INVENTOR
F. H. Quance
BY
ATTORNEY

F. H. QUANCE.
BEAN HARVESTER.
APPLICATION FILED APR. 7, 1915.
1,174,762.
Patented Mar. 7, 1916.
3 SHEETS—SHEET 3.
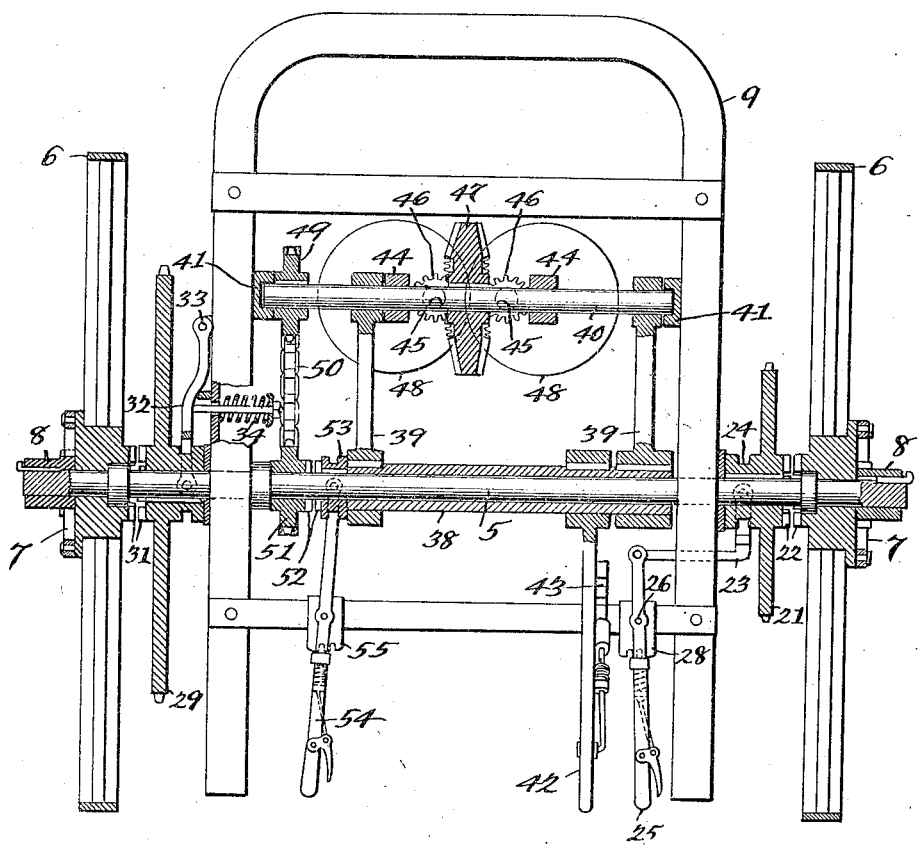
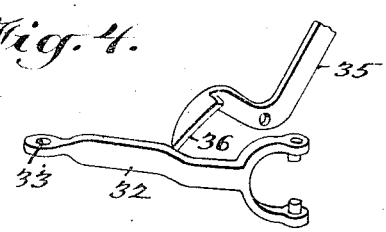
WITNESSES:
INVENTOR
F. H. Quance
BY
ATTORNEY

UNITED STATES PATENT OFFICE.

FRANKLIN HENRY QUANCE, OF CROSWELL, MICHIGAN.

BEAN-HARVESTER.

1,174,762.

Specification of Letters Patent.  Patented Mar. 7, 1916.

Application filed April 7, 1915. Serial No. 19,730.

*To all whom it may concern:*

Be it known that I, FRANKLIN H. QUANCE, a citizen of the United States, and a resident of Croswell, in the county of Sanilac and State of Michigan, have invented certain new and useful Improvements in Bean-Harvesters, of which the following is a specification.

My invention relates to harvesting machines, particularly for beans, and one of the main objects thereof is to provide means for cutting off the stalks at any desired distance above the ground, delivering the same to a receptacle therefor, and, when desired, removing the stalks so delivered from said receptacle, all the parts being carried upon a pair of wheels the revolution of which actuates the mechanism when such actuation is desired.

My invention is fully described in the following specification, of which the accompanying drawings form a part, in which like reference characters refer to like parts in each of the views, and in which:—

Figure 2:
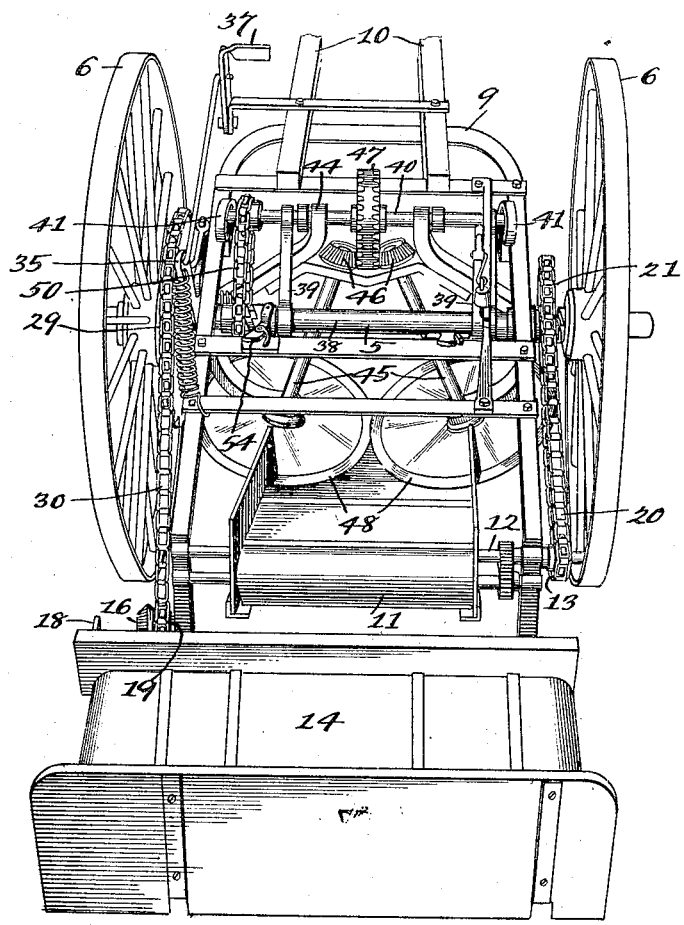

Figure 1 is a perspective view of a harvester constructed in accordance with my present invention; Fig. 2 is a top plan view thereof; Fig. 3 is a plan section taken approximately on the line 3—3 of Fig. 1; and Fig. 4 is a detached view of a detail.

In the drawings forming a part of this application I have shown a present preferred embodiment of my invention, comprising an axle 5 having two independently revolving wheels 6 thereon carrying, each, a plurality of spring-actuated pawls 7 engaged with a ratchet-wheel 8 to insure axle rotation in the forward revolution of the harvester but permitting backward revolution of the wheels or, rather, forward rotation of the axle when one of the wheels is retarded in its revolution, as when making turns.

The axle is freely rotatable in a frame 9 which carries a tongue or shafts 10 when the harvester is drawn by animals, a longitudinally arranged conveyer 11 carried by suitable drums one of which is revolved by means of a shaft 12 carrying a sprocket 13, and a transverse, horizontal, conveyer 14 carried by suitable drums one of which is revolved by means of a pinion 15 enmeshed with a gear 16 on a stub-shaft 17 carried by a bracket 18 and provided with a sprocket 19. The sprocket 13 is actuated by means of an endless chain 20 passed around a sprocket-wheel 21 revoluble on the axle but adapted to be actuated with the adjacent wheel 6 when the clutch 22 is closed, this being accomplished by means of a yoke 23 engaged in a groove 24 of the sprocket-wheel 21 and movable transversely of the harvester, said yoke being in pivotal connection with a hand-lever 25 pivoted at 26 adjacent the driver's seat 27 and adapted to be locked in either operative or inoperative position to a segment 28.

The sprocket 19 is connected with a sprocket-wheel 29, freely rotatable on the axle, by means of a chain 30, a clutch 31 being provided between the same and the adjacent wheel 6, a yoke 32 being in operative connection with said sprocket-wheel 29 and pivoted at 33, a coil-spring 34 normally maintaining the sprocket-wheel in inoperative position; as shown in Figs. 1 and 4, I provide a bell-crank lever 35 adjacent the yoke 32 having an inclined edge 36 bearing against and adapted to move said yoke outwardly and thus connect the members of the clutch 31 to cause the sprocket-wheel 29 to revolve with the wheel 6 and thereby move the conveyer 14, a foot-pedal 37 being provided to actuate the bell-crank lever 35.

The axle carries a sleeve 38 to which are keyed two arms 39 carrying a counter-shaft 40 at their outer ends, the ends of said shaft being projected into corresponding grooves in guide plates 41 secured to the frame 9 and which grooves are concentric with the axle. A hand lever 42 is also keyed to the sleeve 38 whereby the arms 39 may be raised or lowered, said lever being adapted to be locked in desired position to a segment 43 to hold the counter-shaft 40 at a desired elevation above the ground.

The counter-shaft 40 serves as a support for a frame 44 which carries two angularly disposed shafts 45 provided with bevel pinions 46 at their upper ends enmeshed with a bevel gear 47 keyed to the counter-shaft, and each of said shafts 45 carries a cutter disk 48 keyed thereto, one of which is peripherally grooved to receive the other, the shafts 45 being downwardly divergent to bring the contacting edges of said disks nearer the ground than are their outer edges.

The counter shaft 40 has a sprocket 49 keyed thereto connected, by means of a chain 50, with a freely rotatable sprocket 51 on the axle 5 having one member of a clutch 52 thereon and the other member of which is carried by a peripherally grooved collar 53 keyed to the axle but slidable thereon by means of a hand-lever 54 adapted to be locked in operative or inoperative positions by means of a segment 55.

In practice, the contacting edges of the cutter disks 48 are adjusted at a desired height above the ground by means of the hand-lever 42, and the harvester drawn over a field and guided so that the bean plants pass to the contacting cutter edges; when cut, the plants are deposited on the inclined conveyer 11 which carries them to the horizontal conveyer 14 normally inoperative. After a desired accumulation of the plants upon the conveyer 14, the pedal 37 is actuated to throw the sprocket-wheel 29 into engagement with the adjacent wheel 6 to cause movement of the said conveyer 14 and thus deposit the plants in heaps of desired size at desired points and, when said conveyer is relieved of its load, the pedal is released and the spring 34 throws the sprocket-wheel 29 out of gear with the wheel 6 and the conveyer 14 is again inactive.

When desired, I may render the cutter disks inoperative and also raise them into elevated position, out of the way, and I may also render the conveyer 11 inoperative at will, as when going to or from a field. While my harvester is primarily designed for harvesting beans, obviously I am not limited to such use thereof, and I reserve the right to make alterations and changes over the form shown, within the scope of the following claims, to adapt the harvester to a desired use.

Having fully described my invention, what I claim as new, and desire to secure by Letters Patent, is:—

1. A harvester, comprising a frame, an axle thereon, wheels on said axle, means for operatively connecting and disconnecting said wheels and axle, a sleeve rotatable on said axle, two arms secured to said sleeve, a countershaft carried by said arms, a harp-shaped frame dependent from said countershaft, two substantially vertical shafts rotatable in said harp-shaped frame, coöperating cutter disks at the lower ends of said shafts, a pinion at the upper end of each shaft, a gear on said countershaft enmeshed with said pinions, and means for rotating said countershaft through the medium of said axle.

2. A harvester, comprising a frame, an axle thereon, wheels on said axle, means for operatively connecting and disconnecting said wheels and axle, a sleeve rotatable on said axle, two arms secured to said sleeve, a countershaft carried by said arms, a harp-shaped frame dependent from said countershaft, two substantially vertical shafts rotatable in said harp-shaped frame, coöperating cutter disks at the lower ends of said shafts, a pinion at the upper end of each vertical shaft, a gear on said countershaft enmeshed with said pinions, means for swinging said cutter disks toward and from the ground, and means for rotating said countershaft through the medium of said axle.

3. A harvester, comprising a frame, an axle thereon, wheels on said axle, means for operatively connecting and disconnecting said wheels and axle, a sleeve rotatable on said axle, two arms secured to said sleeve, a countershaft carried by said arms, a harp-shaped frame dependent from said countershaft, two substantially vertical shafts rotatable in said harp-shaped frame, coöperating cutter disks at the lower ends of said vertical shafts, said vertical shafts being inclined with respect to each other to correspondingly incline said cutter disks, a pinion at the upper end of each vertical shaft, a two-faced gear on said countershaft enmeshed with said pinions, means for swinging said cutter disks toward or from the ground, and means for rotating said countershaft through the medium of said axle.

In testimony whereof I have signed my name to this specification in the presence of two subscribing witnesses.

FRANKLIN HENRY QUANCE.

Witnesses:
MELVIN H. AUKIN,
FRANK L. FENTON.

Copies of this patent may be obtained for five cents each, by addressing the "Commissioner of Patents, Washington, D. C."